Oct. 23, 1928.
A. BOULADE
1,688,326
FILTER
Filed Sept. 16, 1925
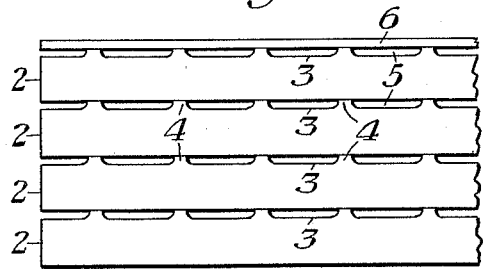
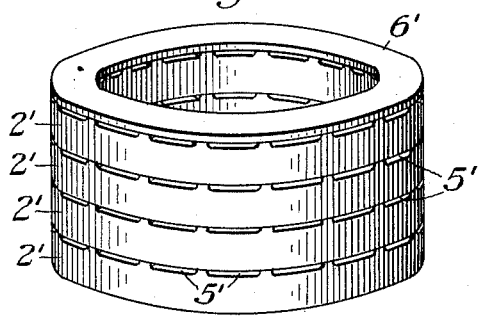
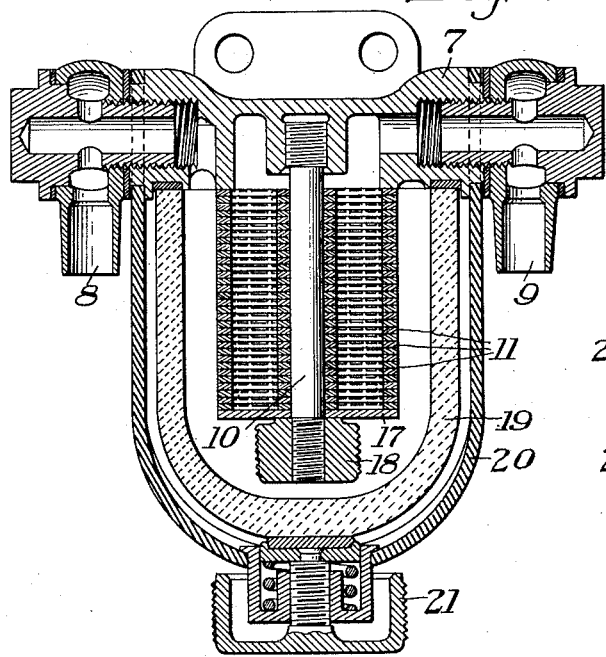
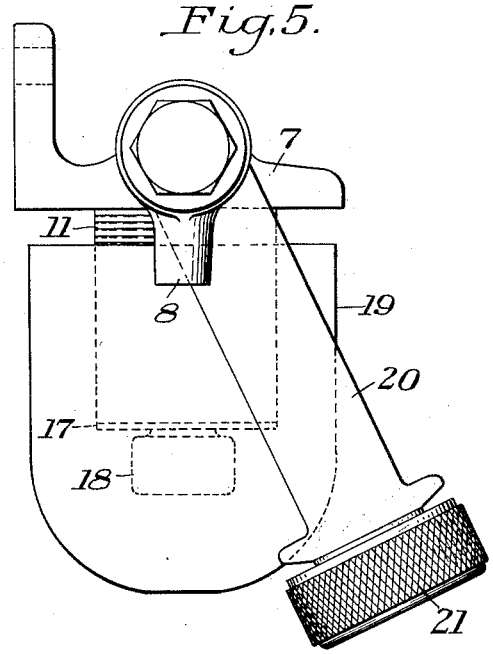
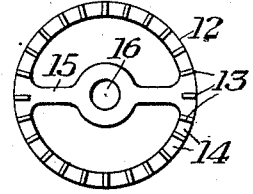
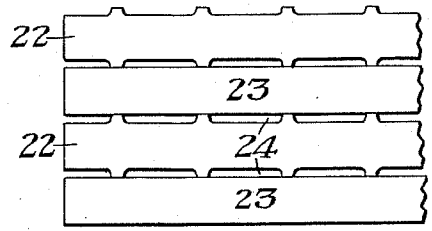
INVENTOR Patented Oct. 23, 1928.

1,688,326

UNITED STATES PATENT OFFICE.

ANTONIN BOULADE, OF LYON, FRANCE, ASSIGNOR TO SOCIETE DU CARBURATEUR ZENITH, OF LYON, FRANCE, A CORPORATION OF FRANCE.

FILTER.

Application filed September 16, 1925. Serial No. 56,651.

The present invention relates broadly to the art of separation, and more particularly to separation of solid particles from fluid in which they are in suspension, or solid particles suspended in air or other gases, and commonly referred to as filtration.

It has heretofore been proposed in the art to which the present invention relates to construct filters by weaving wire or other material to form a filtering surface. The limitations of weaving, however, make it impossible to use wire or other material having a diameter larger than the space left between adjacent strands. As maximum space is determined by the use to which the filter is to be placed, it will be readily apparent that the character and size of the material utilized, and, consequently, the strength of the finished medium, are both limited.

In order to strengthen the filtering medium while maintaining the desired limits as to maximum interstitial areas or filtering spaces, it has also been proposed to construct filters by utilizing one or more strands of material, such as wire, wound upon a suitably shaped perforate body, either in a single layer or superimposed convolutions, with one or more of the strands twisted, indented, or otherwise distorted, to produce, in combination with the other strands or adjacent convolutions, the desired filtering spaces.

Both of the foregoing methods of constructing filters are open to certain objections which it is the object of the present invention to obviate. With the woven medium, the strength is frequently insufficient to provide a self-sustaining or self-supporting surface. With the latter type, it is necessary to first produce a supporting body, and thereafter wind the desired material thereon. This not only requires a number of separate operations, but it necessitates special apparatus for each size filter. Also, the only effective method of cleaning such a filter after it has been in use for some time is by producing a reverse flow of cleaning fluid under pressure therethrough, the construction of the filter being such as to prevent disassembly by the average user thereof.

In accordance with the present invention there is produced what may be termed a unit filter, composed of a plurality of similar or dis-similar elements adapted to be assembled in desired numbers to produce a filter of the required size, and adapted to be disassembled at will for cleaning or repair.

In the accompanying drawings, there are shown for purposes of illustration only, certain preferred embodiments of the present invention, it being understood that the drawings do not define the limits of my invention as changes in the construction and operation disclosed therein may be made without departing either from the spirit of the invention or the scope of my broader claims.

In the drawings:—

Figure 1 is a side elevation illustrating one embodiment of the present invention;

Figure 2 is a perspective view illustrating another embodiment of the invention;

Figure 3 is a vertical sectional view through a filter of the type adapted for use on automotive vehicles for gasoline or the like;

Figure 4 is a top plan view of one of the elements utilized in the filter structure of Figure 3;

Figure 5 is a side elevation of the filter of Figure 3 with the parts in different position; and Figure 6 is a view, similar to Figure 1, showing still another modification of the invention.

In accordance with the present invention, there is provided a filter composed of a plurality of self-supporting elements assembled in such manner and number as to give the desired surface and filtering area. As illustrated in Figure 1 of the drawings, this may be accomplished by utilizing a plurality of elements such as bars 2, having depressions 3 formed at desired intervals in at least one of the surfaces thereof. Preferably, adjacent depressions are separated by projections 4 having a height determined by the desired width of the filtering spaces 5 formed by assembling the elements in superimposed relation. It will be appreciated that any desired number of elements may be assembled at will, and that the arrangement may be varied to give the requisite filtering characteristics.

In Figure 2 there is shown a modification embodying a plurality of elements 2', herein illustrated as being of circular configuration, to give an enclosed central reservoir from which filtered fluids or gases may be drawn at will, or to which fluids or gases may be admitted for passage outwardly through the spaces 5'.

In the forms of both Figures 1 and 2, the elements may be held in assembled relation in any desired manner, and the outer element or elements may cooperate with a flat bar or annulus 6 or 6' respectively, as clearly shown in the drawings.

Figure 3 is illustrative of a commercial form of filter adapted for the filtration of gasoline as supplied to internal combustion engines for automotive or similar purposes. In this embodiment there is provided a filter body 7 having a fuel inlet 8 and an outlet 9. Projecting downwardly from the body is a stem 10 adapted to receive a plurality of elements 11. As shown in Figure 4, each of these elements may comprise an annulus 12 having a plurality of projections 13 forming depressions 14. Extending diametrically of each annulus is a cross bar 15 having a hub provided with an opening 16 adapted to receive the stem 10. After the desired number of elements has been assembled on the stem, a closure disk 17 may be applied to the bottom, and the entire assembly clamped in position by a nut 18. The filter may then be enclosed in a bowl 19 adapted to be received within a yoke 20 having a clamping screw 21.

In Figure 6 there is shown a further form of the invention in which the elements 22 are alternated with other elements 23, alternate elements being of dis-similar construction, but providing, when assembled, the desired filtering spaces 24.

With all of the forms of the invention, the self-supporting elements may be assembled in the desired number to produce the required filter size. If necessary, a filter may be constructed by assembling the elements to provide a surface of multiple thickness with the spaces in adjacent elements either staggered or in alignment. When it is necessary to clear the filter, the entire structure may be quickly disassembled, the elements cleaned, and then reassembled for further use.

The advantages of the present invention arise from the provision of a filter comprising a plurality of separable, parallelly or substantially parallelly extending elements, which are of sufficient cross section as to give the necessary strength to the finished filter, and each of which is self-supporting, thereby eliminating the necessity of a specially prepared perforate body for each filter.

Further advantages of the present invention arise from the flexibility of the structure, obtainable by varying the number of elements, and also from the ease with which the filter may be cleaned as required.

I claim:

1. As an article of manufacture, a filter comprising a body having an inlet and an outlet for the fluid to be filtered, a plurality of filtering elements having annularly extending filtering surfaces and substantially radially extending supporting portions, providing an opening through the elements adapted, when the elements are assembled, to form an internal chamber, certain of said elements having projections on one face adapted to abut against the plane surface of an adjacent element when in assembled relation, a central stem detachably secured to said body and cooperating with the supporting portions of said elements for maintaining the elements in proper cooperative relation, said stem having an enlargement thereon for preventing accidental removal of the elements therefrom when the stem and elements are removed from said body, clamping means for the elements on said stem, and a closure forming a chamber around said elements.

2. As an article of manufacture, a filter comprising a body having an inlet and an outlet for the fluid to be filtered, a plurality of filtering elements having annularly extending filtering surfaces and substantially radially extending supporting portions, providing an opening through the elements adapted, when the elements are assembled, to form an internal chamber, certain of said elements having projections on one face adapted to abut against the plane surface of an adjacent element when in assembled relation, and a central stem detachably secured to said body and snugly fitting the supporting portions of said elements for maintaining the elements in proper cooperative relation, said stem being provided with an enlargement for preventing accidental removal of the elements therefrom when the stem and elements are removed from said body, clamping means for the elements on said stem, and a closure forming a chamber around said elements.

In testimony whereof I have hereunto set my hand.

ANTONIN BOULADE.